June 21, 1960   J. R. HOLLINS   2,942,236
FLASHERS AND CIRCUITS THEREFOR
Filed Feb. 21, 1958
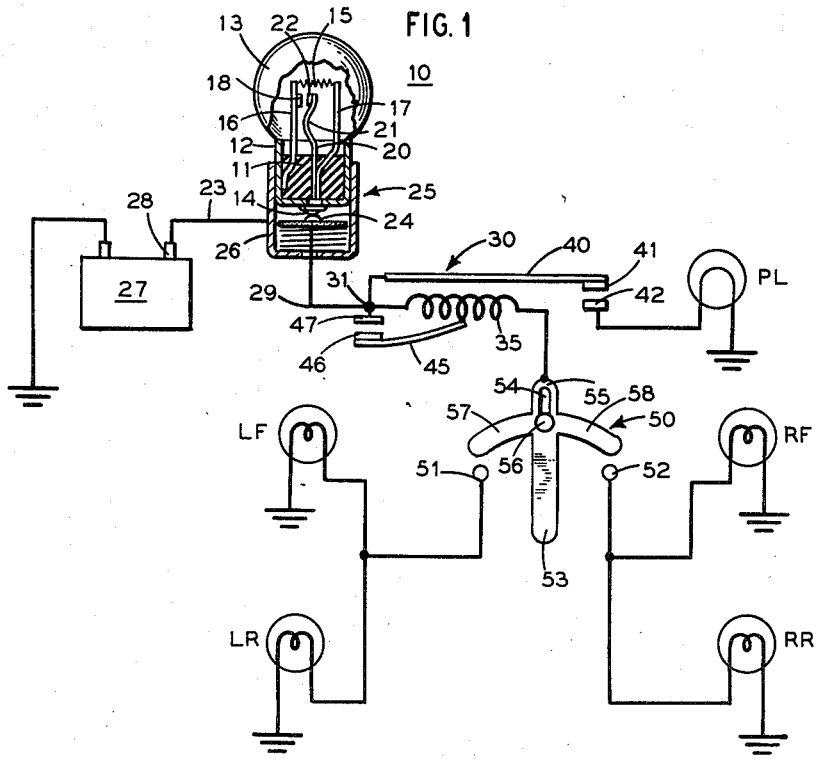
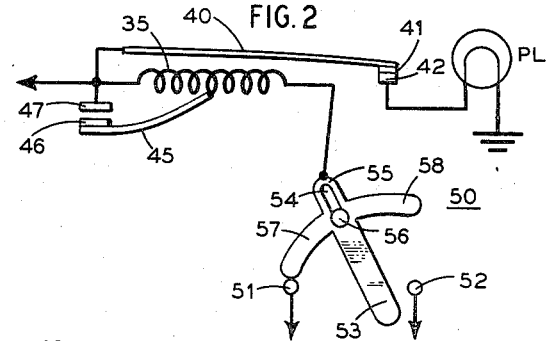
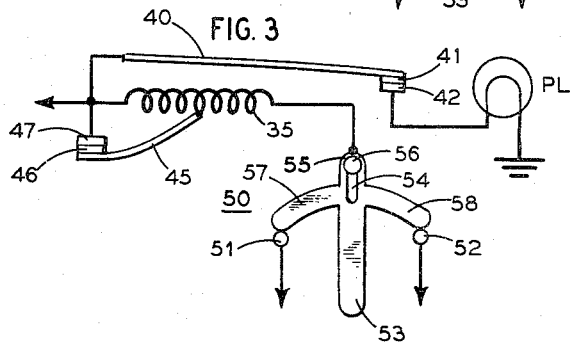
INVENTOR.
Jesse R Hollins
BY
ATTORNEY

United States Patent Office 2,942,236
Patented June 21, 1960

2,942,236

FLASHERS AND CIRCUITS THEREFOR

Jesse R. Hollins, Brooklyn, N.Y., assignor to Signal-Stat Corporation, Brooklyn, N.Y., a corporation of New York Filed Feb. 21, 1958, Ser. No. 716,649

7 Claims. (Cl. 340—81)

This invention relates to automotive or other signal systems of the flashing or intermittent light type and, more particularly, to a novel system of this type including means for automatically maintaining the load on the flasher pilot control at a pre-set value with variable lamp loads.

The circuit interrupters or flashers used in such signal circuits are designed to have certain desired operating characteristics and in accordance with the lamp load to be controlled. For example, at a predetermined current drain or flow, the flasher is calibrated to have a certain operating period. When the load is increased or decreased, the operating cycle time of the flasher is correspondingly varied. Such considerations are particularly important in the design of thermal flashers utilizing a high resistance as the cycling control element. If the current drain greatly exceeds the design value, there is a strong possibility of burning out the high resistance element.

In prior patents, I have disclosed and claimed certain novel arrangements whereby the usual turn signal system of a motor vehicle, wherein signal lamps on a selected side of the vehicle are flashed to signal a projected turn, may be additionally utilized as a "flare" or danger signal system with all the signal lamps being flashed at the same time. In such arrangements, the current drawn during "flare" operation of all the signal lamps is substantially twice the current drawn when the signal lamps on one side only of the vehicle are flashed during a turn signal operation.

Due to the 100% variation in the load of systems designed for both turn and "flare" signalling, special provisions must be made to keep the flasher load at or near the value for which the flasher is calibrated. Generally, this has caused overload of the flasher, shortening its life, and has often necessitated the use of separate flashers for the signal lamps on each side of the vehicle. These special provisions have increased the material and labor expense involved in such combined installations.

In accordance with the present invention, a greatly simplified arrangement is provided for maintaining the load on the flasher at or near a pre-set value irrespective of wide variations in the connected lamp load. This is effected by providing a thermally operated switch for the usual pilot or indicator lamp and including a high resistance coil in series between the flasher and the selector switch for the signal lamps. An electrically conductive thermomotive element, such as a bimetallic strip, is arranged in heat transfer relation with the coil. A fixed end of the element is connected to the flasher output terminal and the movable portion of the element carries a contact arranged, upon flexing of the element, to engage a contact connected to the pilot or indicator lamp.

When the flasher operates to provide full current flow to the signal lamps, the high resistance of the resistance coil causes the latter to heat up. This heating of the resistance coil causes heating of the thermomotive element which is adjacent the coil, and this element deflects to connect the pilot lamp to the flasher. The flasher cycle is so designed that, in the "lamps off" portion of the cycle, there is insufficient time for the thermomotive element to cool sufficiently to disengage the pilot lamp contact. However, the pilot lamp, being thus connected in the flasher controlled lamp circuit, is flashed in synchronism with the signal lamps. The thermomotive element is so designed that it operates to close the pilot lamp circuit only when all the signal lamps on one side of the vehicle are drawing current. Should one or more lamps on one side to be inoperative, the resistance coil in the circuit will have insufficient current flow therethrough to cause enough heating of the coil to effect heating of the adjacent thermomotive element sufficiently to cause deflection of the latter. Hence, the pilot lamp circuit will not be closed, and the failure of the pilot lamp to flash serves as an indication of signal lamp failure.

With the arrangement so far described, the flasher load is at a pre-set value whenever a turn is being signalled, the load including the high resistance coil of the pilot lamp control, the signal lamps on one side of the vehicle, and the pilot lamp. The resistance drop across the coil is a set value determined by the lamp current and the resistance of the coil, and the flasher is so calibrated that, taking into account this resistance drop, a potential is applied to the signal lamps sufficient for full illumination thereof during the "lamps on" portion of the flasher cycle. However, when the selector switch is moved to the "flare" position, the signal lamp current is doubled and thus the resistance drop across the high resistance coil is doubled. Not only does this reduce the potential applied to the signal lamps to a value greatly reducing their illumination, but also the increased load on the flasher may result in burning out its high resistance element.

To prevent this condition and to maintain the resistance drop across the high resistance coil substantially constant with either turn or flare signalling, a second thermomotive element is arranged in heat transfer relation with the coil of the pilot lamp control. This second thermomotive element is so designed that it will flex only when the current flow through the coil is doubled, as during flare signalling. When this second element thus flexes, it closes a circuit shunting a selected portion of the high resistance coil to reduce the effective resistance drop through the coil to substantially the value during turn signal operation. At the same time, the double current flow through the non-shunted part of the coil provides sufficient heat to maintain the first thermomotive element flexed to close the pilot lamp circuit.

For an understanding of the invention principles, reference is made to the following description of a typical embodiment thereof as illustrated in the accompanying drawing. In the drawing:

Fig. 1 is a schematic wiring diagram of an automotive turn and flare signalling circuit incorporating the invention;

Fig. 2 illustrates the pilot lamp control during turn signal operation; and

Fig. 3 illustrates the pilot lamp control during flare signal operation.

Referring to Fig. 1, the signal circuit is illustrated as including, by way of example, a combined flasher and pilot lamp unit 10 of the type disclosed and claimed in my copending application Serial No. 716,680, filed March 6, 1958. As disclosed in said application, the combined flasher and pilot lamp unit 10 has the general appearance and constructional features of the usual single filament automotive lamp. Unit 10 has a dielectric base 11, with a conductive metal contact band 12 therearound, and a sealed glass envelope 13. While base 11 is illustrated as a bayonet type base, it will be understood that the base could equally well be a screw type base. Envelope 13 may be evacuated or may contain an inert gas.

Base 11 has the usual central contact 14 connected to a conductor 16 projecting as a support leg into envelope 13. Also, the usual conductor 17 is connected to contact band 12 and extends as a support leg into envelope 13 in spaced relation to conductor 16. The usual high resistance filament 15 is connected between the outer ends of conductors 16 and 17.

A thermomotive element 20, such as a bimetallic strip, is mounted in base 11 and electrically connected either to contact 14 or contact band 12. By way of example, element 20 is illustrated as electrically connected to contact 14 and thus to conductor 16. The projecting portion 21 of element 20, within envelope 13, is bowed toward conductor 17. If desired, cooperable contacts 18 and 22 may be provided on conductor 17 and element 20.

With the arrangement thus far described, when an electric potential is applied between contact band 12 and contact 14, the current flowing through high resistance filament 15 will cause the latter to heat and glow, thus heating the interior of envelope 13 and providing a source of light. The heat in envelope 13 causes thermomotive element 20 to expand and move its free end toward conductor 17. When element 20 engages conductor 17, or when contacts 18 and 22 engage, the high resistance filament 15 is shunted by the low resistance circuit comprising element 20 and conductor 17. Consequently, the light from envelope 13 is extinguished, filament 15 rapidly cools and, with the dissipation of heat from envelope 13, element 20 cools and contracts. This removes the shunt from filament 15 and the cycle repeats.

Base 11 of unit 10 is inserted into a metal socket 25 having a spring biased control contact 24 engaged by contact 14 and a metal side wall 26 engaged by contact band 12. A conductor 23 connects side wall 26 to the hot contact 28 of the usual grounded automotive battery 27 representative of the vehicle source of electric potential. A conductor 29 connects contact 24 to the input terminal 31 of a pilot lamp control generally designated 30.

Control 30 includes a high resistance coil 35, a first thermomotive element 40, and a second thermomotive element 45. One end of coil 35 is connected to terminal 31 and the other end of the coil is connected to the movable element 55 of a selector switch generally indicated at 50. Selector switch 50 includes a fixed contact 51, connected to grounded front and rear signal lamps LF and LR, respectively, on the left side of the vehicle, and a fixed contact 52 connected to grounded front and rear signal lamps RF and RR, respectively, on the right side of the vehicle. Coil 35 is thus in series between flasher 10 and the signal lamps so that all the signal lamp current flows therethrough.

The selector switch 50 is schematically indicated as designed to energize either the right side lamps, the left side lamps, or all the signal lamps, being thus capable of either signalling a turn or providing a "flare" signal. Thus, movable element 55 has an operating handle 53 and is formed with an elongated slot 54 receiving a pivot pin 56. Element 55 may thus be pivoted about pin 56 to engage arm 57 with contact 51 (or arm 58 with contact 52), or pulled down to engage both arms at once with their respective contacts.

Thermomotive element 40 has a fixed end connected to terminal 31 and a free end carrying a contact 41 engageable, upon flexing of element 40, with a contact 42 connected to grounded pilot or indicator lamp PL.

In the arrangement illustrated, thermomotive element 45 has a fixed end connected to an intermediate and preferably central portion of coil 35 and a free end carrying a contact 46. When element 45 flexes, contact 47 engages a contact 48 connected to terminal 31.

The operation of the system when signalling a turn will be explained with reference to Figs. 1 and 2. When selector switch 50 is operated to engage element 55 with fixed contact 51, a circuit is closed as follows: battery 27, conductor 23, side wall 26, band 12, conductor 17, filament 15, conductor 16, contacts 14, 24, conductor 29, terminal 31, high resistance coil 35, element 55, contact 51, and signal lamps LF and LR. Due to the high resistance of filament 15, there is insufficient potential available at the signal lamps to illuminate the latter. As filament 15 heats the interior of envelope 13, thermomotive element deflects to engage conductor 17 and shunt filament 15 to provide a relatively low resistance supply circuit to the signal lamps which thereupon are illuminated.

The increased current flow through coil 35 heats this coil sufficiently to cause thermomotive element 40 to deflect and engage contacts 41 and 42 to light pilot lamp PL, as shown in Fig. 2. However, the heating at this time is insufficient for flexing of thermomotive element 45 so that contacts 46, 47 remain disengaged.

As filament 15 cools, element 20 disengages conductor 17 to remove the shunt from filament 15. The current flow through the circuit is reduced to a value insufficient to illuminate lamps LF, LR and PL. Element 40 starts to cool but is so designed that it will not flex sufficiently to disengage contacts 41, 42 before element 20 is again heated sufficiently to engage conductor 17 to again shunt filament 15. Nevertheless, as lamp PL remains connected in parallel with lamps LF and LR, this pilot lamp is flashed in synchronism with the signal lamps. When element 55 of switch 50 is restored to neutral, all parts resume the position of Fig. 1.

Fig. 3 illustrates the conditions during flare operation. To provide a flare signal, arm 55 of switch 50 is pulled down to simultaneously engage both contacts 51 and 52. The operating cycle of flasher unit 10 is the same as described but, due to the doubled current flow through coil 35, the effective potential at lamps LF, LR, RF and RR is reduced, reducing their degree of illumination. Also, the heavy current flow alters the timing of the flasher cycle and may burn out parts of unit 10. Element 40 is flexed to close the pilot lamp circuit in the same manner as described.

However, the increased current flow in coil 35 results in sufficient heat to flex element 45 to engage contacts 46, 47 to shunt a section of coil 35. This reduces the potential drop across the effective part of coil 35 to about the same value as provided by the whole coil during turn signalling. At the same time, the doubled current in the effective (non-shunted) part of coil 35 provides sufficient heat to maintain element 40 flexed with the pilot lamp circuit closed. Due to shunting of part of coil 35, the load on flasher unit 10 is reduced to substantially its normal value, and the normal illuminating potential is available at lamps LF, LR, RF and RR.

While a specific embodiment of the invention has been shown and described in detail to illustrate the application of the invention principles, it will be understood that the invention may be embodied otherwise without departing from such principles.

What is claimed is:

1. An automotive vehicle signalling system comprising, in combination, a source of potential; two sets of signal lamps; a flasher connected to said source for controlling current flow to said signal lamps, said flasher being calibrated for predetermined cyclic circuit interruption when controlling current flow to one set of signal lamps; a selector switch including a pair of contacts each connected to a different set of signal lamps and a movable arm slectively engageable with either contact alone or with both contacts simultaneously; a resistance heating element connected in series between said flasher and said movable selector normally open thermomotive switch arm; and switch means connected in shunt with a portion of said resistance heating element and operable, responsive to increased current flow through the latter when both sets of lamps are connected to said flasher, to close to shunt such portion of said resistance element to reduce the load on said flasher to substantially the load thereon when controlling current flow to one set of lamps.

2. An automotive vehicle signalling system comprising, in combination, a source of potential; two sets of signal lamps; a flasher connected to said source for controlling current flow to said signal lamps; a selector switch including a pair of contacts each connected to a different set of signal lamps and a movable arm selectively engageable with either contact alone or with both contacts simultaneously; a resistance heating element connnected in series between said flasher and said movable selector switch arm; said flasher being calibrated for predetermined cyclic circuit interruption when controlling current flow to one set of signal lamps through said resistance heating element; and normally open thermomotive switch means connected in shunt with a portion of said resistance heating element and operable, responsive to increased current flow through the latter when both sets of lamps are connected to said flasher, to close to shunt such portion of said resistance element to reduce the load on said flasher to substantially the load thereon when controlling current flow to one set of lamps.

3. An automotive vehicle signalling system comprising, in combination, a source of potential; two sets of signal lamps; a flasher connected to said source for controlling current flow to said signal lamps, a selector switch including a pair of contacts each connected to a different set of signal lamps and a movable arm selectively engageable with either contact alone or with both contacts simultaneously; a resistance heating element connected in series between said flasher and said movable selector switch arm; said flasher being calibrated for predetermined cyclic circuit interruption when controlling current flow to one set of signal lamps through said resistance heating element; a pilot lamp; first normally open thermomotive switch means operatively associated with said resistance heating element and operable, responsive to current flow through said element when one set of lamps is connected to said flasher, to connect said pilot lamp to said flasher; and second normally open thermomotive switch means connected in shunt with a portion of said resistance heating element and operable, responsive to increased current flow through the latter when both sets of lamps are connected to said flasher, to close to shunt such portion of said resistance heating element to reduce the load on said flasher to substantially the load thereon when controlling current flow to one set of lamps.

4. An automotive vehicle signalling system comprising, in combination, a source of potential; two sets of signal lamps; a flasher connnected to said source for controlling current flow to said signal lamps; a selector switch including a pair of contacts each connected to a different set of signal lamps and a movable arm selectively engageable with either contact; a resistance heating element connected in series between said flasher and said movable selector normally open thermomotive switch arm; a pilot lamp; and switch means operatively associated with said resistance element and connected between said flasher and said pilot means and operable, responsive to current flow through the latter when one set of lamps is connected to said flasher, to connect said pilot lamp to said flasher.

5. An automotive vehicle signalling system as claimed in claim 4 in which said switch means is a thermomotive element having a cycle of operation longer than that of said flasher, whereby said switch means, when operated to close the pilot lamp circuit, remains so operated when the current flow to the signal lamps is momentarily reduced to an ineffective value during the "off" portion of the flasher cycle.

6. An automotive vehicle signalling system as claimed in claim 3 in which said first switch means has a cycle of operation longer than that of said flasher, whereby said first switch means, when operated to close the pilot lamp circuit, remains so operated when the current flow to the signal lamps is momentarily reduced to an ineffective value during the "off" portion of the flasher cycle.

7. An automotive vehicle signalling system as claimed in claim 6 in which said second switch means has a fixed end connected to a point intermediate the ends of said resistance heating element, and a movable end engageable with a contact connected to said flasher.

References Cited in the file of this patent

UNITED STATES PATENTS

| | | |
|---|---|---|
| 2,030,664 | Thielacker | Feb. 11, 1936 |
| 2,321,803 | Falge et al. | June 15, 1943 |
| 2,562,275 | Hollins | July 31, 1951 |